US012800727B2

(12) United States Patent
Wang et al.

(10) Patent No.: US 12,800,727 B2
(45) Date of Patent: Nov. 17, 2026

(54) DETECTION APPARATUS, CONTROL METHOD AND CONTROL APPARATUS OF DETECTION APPARATUS, LIDAR SYSTEM, AND TERMINAL

(71) Applicant: Yinwang Intelligent Technologies Co., Ltd., Shenzhen (CN)

(72) Inventors: Hongliang Wang, Shenzhen (CN); Wei Wang, Shanghai (CN); Aijuan Zhang, Shanghai (CN); Anliang Yu, Shanghai (CN); Yuemeng Wang, Shanghai (CN); Kai An, Wuhan (CN); Riliang Su, Shanghai (CN); Bingcheng Du, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 765 days.

(21) Appl. No.: 18/326,275

(22) Filed: May 31, 2023

(65) Prior Publication Data

US 2023/0305117 A1 Sep. 28, 2023

Related U.S. Application Data

(63) Continuation of application No. PCT/CN2021/131468, filed on Nov. 18, 2021.

(30) Foreign Application Priority Data

Dec. 2, 2020 (CN) ........................ 202011391587.5

(51) Int. Cl.
*G01S 7/481* (2006.01)
*G01S 17/931* (2020.01)

(52) U.S. Cl.
CPC .......... *G01S 7/4817* (2013.01); *G01S 7/4814* (2013.01); *G01S 7/4816* (2013.01); *G01S 17/931* (2020.01)

(58) Field of Classification Search
None
See application file for complete search history.

(56) References Cited

U.S. PATENT DOCUMENTS

2019/0132572 A1* 5/2019 Shen .................... G05D 1/0251
2019/0324147 A1* 10/2019 Day ........................ G01S 7/026

FOREIGN PATENT DOCUMENTS

CN 105785341 A 7/2016
CN 107219532 A 9/2017
(Continued)

OTHER PUBLICATIONS

International Search Report and Written Opinion in International Appln. No. PCT/CN2021/131468, mailed on Feb. 17, 2022, 19 pages (with English translation).
(Continued)

*Primary Examiner* — Luke D Ratcliffe
(74) *Attorney, Agent, or Firm* — Fish & Richardson P.C.

(57) ABSTRACT

A detection apparatus, a control method and control apparatus of the detection apparatus, a lidar system, and a terminal are provided. The detection apparatus includes at least one laser, at least one planar array detector, at least one lens assembly, at least one optical detector, and at least one micro electro mechanical system MEMS micromirror. The lens assembly is configured to focus reflected light of at least one first laser light beam to the planar array detector. The MEMS micromirror is configured to reflect reflected light of at least one second laser light beam to the optical detector.

20 Claims, 7 Drawing Sheets

(56) References Cited

FOREIGN PATENT DOCUMENTS

| | | | |
|---|---|---|---|
| CN | 108761424 | A | 11/2018 |
| CN | 208520990 | U | 2/2019 |
| CN | 110632618 | A | 12/2019 |
| CN | 110806569 | A | 2/2020 |
| EP | 3477338 | A1 | 5/2019 |

OTHER PUBLICATIONS

Extended European Search Report in European Appln. No. 21899886.2, mailed on Feb. 16, 2024, 9 pages.

* cited by examiner

DETECTION APPARATUS, CONTROL METHOD AND CONTROL APPARATUS OF DETECTION APPARATUS, LIDAR SYSTEM, AND TERMINAL

CROSS-REFERENCE TO RELATED APPLICATIONS

This application is a continuation of International Application No. PCT/CN2021/131468, filed on Nov. 18, 2021, which claims priority to Chinese Patent Application No. 202011391587.5, filed on Dec. 2, 2020. The disclosures of the aforementioned applications are hereby incorporated by reference in their entireties.

TECHNICAL FIELD

This application relates to the detection field, and in particular, to a detection apparatus, a control method and control apparatus of the detection apparatus, a lidar system, and a vehicle.

BACKGROUND

A micro electro mechanical system (micro electro mechanical system, MEMS) lidar system has characteristics of a small volume, low power consumption and easy integration, and therefore is widely used. The MEMS lidar system includes a control module, a laser, a MEMS micromirror, a detector, and the like. The laser emits laser light to the MEMS micromirror. Under control of a drive signal generated by the control module, the MEMS micromirror swings around two axes in a horizontal direction and a vertical direction, to reflect the laser light to a field of view. A target in the field of view reflects the laser light. The laser light reflected by the target may be reflected and transmitted to the detector by the MEMS micromirror. Therefore, a distance between the detector and the target can be determined based on an optical path difference. A MEMS is limited in size. Therefore, only a target within a short distance can be detected and ranged.

SUMMARY

This application provides a detection apparatus, a control method and control apparatus of the detection apparatus, a lidar system, and a vehicle, to implement a dual detection mode to perform long-distance ranging.

According to a first aspect, a detection apparatus is provided, including: at least one laser, at least one planar array detector, at least one lens assembly, at least one optical detector, and at least one micro electro mechanical system MEMS micromirror. The lens assembly is configured to focus reflected light of at least one first laser light beam to the planar array detector, and the reflected light of the at least one first laser light beam is located within a detection range of the lens assembly. The MEMS micromirror is configured to reflect reflected light of at least one second laser light beam to the optical detector, and the reflected light of the at least one second laser light beam is within a detection range of the MEMS micromirror. The at least one first laser light beam and the at least one second laser light beam are emitted by using the at least one laser.

The detection apparatus separately receives reflected light of laser light in different regions in two detection manners: the MEMS micromirror and the lens assembly, to perform long-distance ranging.

The lens assembly is configured to receive reflected light of laser light, and can implement long-distance detection. During detection, each detection unit in the planar array detector may receive and detect reflected light that is of laser light transmitted along a laser light transmission direction and that is within the detection range of the lens assembly. The MEMS micromirror may reflect reflected light that is of laser light transmitted in all laser light transmission directions and that is within the detection range of the MEMS micromirror, so that the optical detector can receive and detect the reflected light of the laser light transmitted in all the laser light transmission directions.

During detection, the reflected light of the laser light in different regions is separately received in the two manners: the MEMS micromirror and the lens assembly, so that a quantity of optical detection elements in the detection apparatus is reduced. All detection units in the optical detector and the planar array detector are optical detection elements. In this way, the detection apparatus has a small volume and causes low costs while implementing long-distance detection.

It should be understood that the detection range of the lens assembly does not fully overlap the detection range of the MEMS micromirror.

With reference to the first aspect, in some possible implementations, a focal length of the lens assembly is adjustable, and when the focal length of the lens assembly is increased, a laser scanning density within the detection range of the lens assembly is increased.

When the focal length of the lens assembly is increased, the laser scanning density within the detection range of the lens assembly is increased, so that resolution of the detection range of the lens assembly can be improved, and accuracy of a detection result is improved.

When the focal length of the lens assembly is increased, if a scanning density the same as that before the focal length is increased is used to scan a same range, the scanning density may be excessively low, and a large interval between two adjacent scanning directions cannot accurately reflect a distance between a target within the detection range of the lens assembly and the detection apparatus. There may be a case in which accurate detection cannot be performed because the target is located between the two adjacent scanning directions. Therefore, when the focal length of the lens assembly is increased, a laser scanning density within the detection range of the lens assembly may be increased, to improve accuracy and reliability of a detection result.

With reference to the first aspect, in some possible implementations, the at least one first laser light beam is emitted by at least one first laser in the at least one laser, and the at least one second laser light beam is emitted by at least one second laser in the at least one laser, where the at least one first laser is different from the at least one second laser.

When the at least one first laser and the at least one second laser may include at least one same laser, the same laser is configured to emit first laser light, to scan all or some regions within the detection range of the MEMS micromirror, and is also configured to emit second laser light, to scan all or some regions within the detection range of the lens assembly. When a focal length of the MEMS micromirror is adjustable, and the laser scanning density within the detection range of the lens assembly changes with the focal length of the MEMS micromirror, a laser scanning density within the detection range of the MEMS micromirror may be different from the laser scanning density within the detection range of the lens assembly. Consequently, control on the detection apparatus is complex.

For the detection range of the MEMS micromirror and the detection range of the lens assembly, different lasers are respectively used to emit laser light for detection, so that control difficulty can be reduced.

With reference to the first aspect, in some possible implementations, there is no blind region between the detection range of the lens assembly and the detection range of the MEMS micromirror.

There is no blind region between the detection range of the lens assembly and the detection range of the MEMS micromirror, so that detection results are continuous in regions, so that reliability of a detection result is improved.

With reference to the first aspect, in some possible implementations, adjustment of the detection range of the lens assembly matches adjustment of the detection range of the MEMS micromirror, so that there is no overlapping between the detection range of the lens assembly and the detection range of the MEMS micromirror.

There is no overlapping between the detection range of the MEMS micromirror and the detection range of the lens component, so that repeated calculation and processing for detection results in a same direction is avoided, and resource occupation is reduced.

With reference to the first aspect, in some possible implementations, the MEMS micromirror is further configured to reflect the at least one second laser light beam, to scan the detection range of the MEMS micromirror.

Detection may be performed in a coaxial manner within the detection range of the MEMS micromirror. In a MEMS-based scanning manner, a scanning direction is flexible and controllable, and anti-vibration reliability is higher.

With reference to the first aspect, in some possible implementations, there are a plurality of MEMS micromirrors, and directions of the plurality of MEMS micromirrors are the same when the reflected light of the at least one second laser light beam is reflected.

Compared with that in a manner in which one MEMS micromirror performs reflection, in a manner in which a plurality of MEMS micromirrors in a same direction are used to reflect the reflected light of the second laser light to the optical detector, an area of a reflector is increased, so that energy of the reflected light that is of the second laser light and that is received by the optical detector is increased. In this way, an effective detection distance is increased when the MEMS micromirror is used for coaxial detection. In other words, an effective detection distance of the detection apparatus for the detection range of the MEMS micromirror is increased.

With reference to the first aspect, in some possible implementation, the MEMS micromirror is further configured to reflect the at least one first laser light, to scan the detection range of the lens assembly.

Distance detection may be performed in an off-axis manner within the detection range of the lens assembly. A same MEMS micromirror is used to scan the detection range of the MEMS micromirror and the detection range of the lens assembly, so that a quantity of MEMS micromirrors can be reduced, a quantity of control signals is reduced, and difficulty in controlling the MEMS micromirror is reduced.

According to a second aspect, a control method is provided, applied to a detection apparatus. The detection apparatus includes at least one laser, at least one planar array detector, at least one lens assembly, at least one optical detector, and at least one micro electro mechanical system MEMS micromirror. The method includes: controlling the at least one laser to emit at least one first laser light beam, where reflected light of the at least one first laser light beam is focused to the planar array detector by using the lens assembly, and the reflected light of the at least one first laser beam is located within a detection range of the lens assembly; and controlling the at least one laser to emit at least one second laser light beam, where reflected light of the at least one second laser light beam is reflected to the optical detector by the MEMS micromirror, and the reflected light of the at least one second laser light beam is located within a detection range of the MEMS micromirror.

With reference to the second aspect, in some possible implementations, a focal length of the lens assembly is adjustable, and when the focal length of the lens assembly is increased, a laser scanning density within the detection range of the lens assembly is increased.

With reference to the second aspect, in some possible implementations, there is no blind region between the detection range of the lens assembly and the detection range of the MEMS micromirror.

With reference to the second aspect, in some possible implementations, the method further includes: adjusting the detection range of the MEMS micromirror and/or the detection range of the lens assembly, so that there is no overlapping between the detection range of the lens assembly and the detection range of the MEMS micromirror.

With reference to the second aspect, in some possible implementations, the at least one first laser light beam is emitted by at least one first laser in the at least one laser, and the at least one second laser light beam is emitted by at least one second laser in the at least one laser, where the at least one first laser is different from the at least one second laser.

With reference to the second aspect, in some possible implementations, the MEMS micromirror is further configured to reflect the at least one second laser light beam, to scan the detection range of the MEMS micromirror.

With reference to the second aspect, in some possible implementations, there are a plurality of MEMS micromirrors, and directions of the plurality of MEMS micromirrors are the same when the reflected light of the at least one second laser light beam is reflected.

According to a third aspect, a control apparatus of a detection apparatus is provided, including at least one memory and at least one processor. The at least one memory is configured to store a program, and the at least one processor is configured to run the program, to implement the method according to the second aspect.

According to a fourth aspect, a control apparatus of a detection apparatus is provided, including a storage module and a processing module. The storage module is configured to store a program, and the processing module is configured to run the program, to implement the method according to the second aspect.

According to a fifth aspect, a chip is provided, including at least one processor and an interface circuit. The interface circuit is configured to provide program instructions or data for the at least one processor, and the at least one processor is configured to execute the program instructions, to implement the method according to the second aspect.

According to a sixth aspect, a computer-readable storage medium is provided. The computer-readable medium stores program code to be executed by a device. When the program code is executed by the device, the method according to the second aspect is implemented.

According to a seventh aspect, a lidar system is provided, including a processor and the detection apparatus according to the first aspect. The processor is configured to control the at least one laser in the detection apparatus to emit laser light.

Optionally, the processor is further configured to calculate a distance based on reflected light that is of laser light and that is received by the at least one optical detector and the at least one planar array detector.

Optionally, the lidar system may further include the control apparatus of the detection apparatus according to the third aspect or the fourth aspect.

According to an eighth aspect, a terminal is provided, including the lidar system according to the seventh aspect. Further, the terminal may be an intelligent transportation device (a vehicle or an uncrewed aerial vehicle), a smart home device, an intelligent manufacturing device, a robot, or the like. The intelligent transportation device may be, for example, an automated guided vehicle (automated guided vehicle, AGV) or an uncrewed transportation vehicle.

DESCRIPTION OF EMBODIMENTS

The following describes technical solutions of this application with reference to accompanying drawings.

A lidar (light detection and ranging, Lidar) system is used for distance detection. A lidar emits laser light to a detection target, and then a receiver collects an optical signal reflected by the target, and determines a distance between the target and the receiver by measuring a round-trip time period of an emission signal. Laser light has advantages of high coherence, directivity and monochromaticity. Therefore, the lidar system can realize a long-distance and high-precision ranging function. The lidar system extends a single-point ranging result to a two-dimensional ranging result in a scanning manner or a multi-element array detection manner, to form a distance image. Currently, the lidar system is applied in many occasions such as autonomous driving, building three-dimensional modeling, terrain mapping, robot, and rendezvous and docking.

The lidar system usually includes two types: a mechanical lidar and a solid-state lidar (or may further include a hybrid solid-state lidar, which is not specifically distinguished herein). Although the mechanical lidar can implement large-angle scanning, a scanning frequency is low. In addition, stability of the system is limited due to use of a large scanning component. Compared with the mechanical lidar, the solid-state lidar has advantages of good stability, strong anti-vibration, and high integration. A MEMS micromirror-based lidar is one of typical representatives of the solid-state lidar. A MEMS micromirror is a micro-scanning component that has specific integration and that is based on a micro electro mechanical principle. Compared with that of a conventional mechanical scanning component, stability of the scanning component is further improved.

Figure 1:
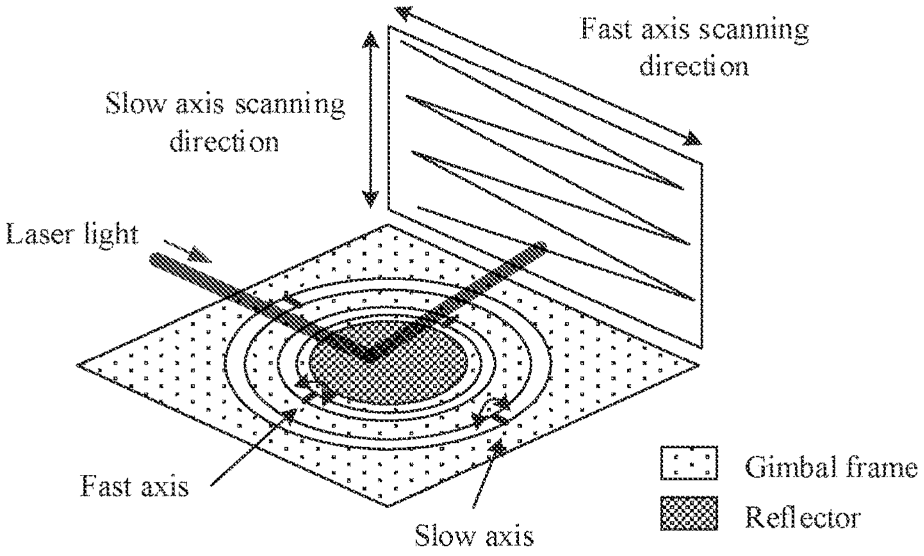
FIG. 1 is a schematic diagram of a structure of a lidar system.

FIG. 1 is a schematic diagram of a working principle of a micro electro mechanical scanning system according to an embodiment of this application.

A micro electro mechanical system (micro electro mechanical system, MEMS) may alternatively be referred to as a micro-electronic mechanical system, a micro system, a micro-mechanical system, or the like. The micro electro mechanical system is a high-tech electronic mechanical device that is developed based on a micro-electronic technology (semiconductor manufacturing technology) and that is manufactured by integrating technologies such as lithography, corrosion, thin film, silicon micromachining, non-silicon micromachining, precision mechanical processing, and the like.

In this application, the MEMS applied to the lidar system may be a micro electro mechanical scanning system. The micro electro mechanical scanning system includes a reflector and a driving apparatus. Laser light is irradiated on the reflector, and the driving apparatus adjusts an orientation of the reflector, so that the laser light can scan an environment. The reflector in the micro electro mechanical scanning system may alternatively be referred to as a micro electro mechanical scanning mirror, a MEMS micro vibration mirror, or a MEMS micromirror.

The driving apparatus may adjust an orientation of the reflector in one or more of a plurality of control manners such as electrostatic driving, electromagnetic driving, and electrothermal driving, to change an optical path.

An electrostatic-driven driving apparatus includes a movable upper-level plate and a fastened lower-level plate. The reflector may be disposed on the upper-level plate. A coulomb force between a charge of the upper-level plate and a charge of the lower-level plate is used as a driving force, so that an orientation of the reflector can be changed.

In an electrothermal-driven driving apparatus, a thermosensitive material that is sensitive to temperature and generates different shape variables is used to connect a reflector to a fastened plate. Temperature of the thermosensitive material is controlled by controlling a magnitude of a current flowing through the thermosensitive material, to change an orientation of the reflector.

In an electromagnetic-driven driving apparatus, an acting force (namely, a magnetic field force) of a magnetic field on a current in the electromagnetic-driven driving apparatus is used as a driving force, to change an orientation of a reflector. In FIG. 1, an electromagnetic-driven micro electro mechanical scanning system is used as an example for description.

The micro electro mechanical scanning system shown in a schematic diagram in FIG. 1 is a possible micro electro mechanical system, and includes a reflector and a driving apparatus. The driving apparatus includes a gimbal frame (gimbal frame) and a magnet (not shown) disposed around the gimbal frame. The reflector is disposed in the gimbal frame. The gimbal frame includes a coil disposed on the gimbal frame.

When the micro electro mechanical scanning system is working, a current flowing through the coil disposed on the gimbal frame is controlled. The magnet disposed around the gimbal frame provides a magnetic field, and generates a magnetic field force against the coil through which a current flows. In this way, a force torque is generated on the gimbal frame and components are generated in directions of two rotation axes (for example, a fast axis and a slow axis). The two components of the torque enable the reflector disposed on the gimbal frame to rotate biaxially, so that laser light emitted by a laser to the reflector implements transverse and longitudinal spatial scanning in a field of view.

Figure 2:
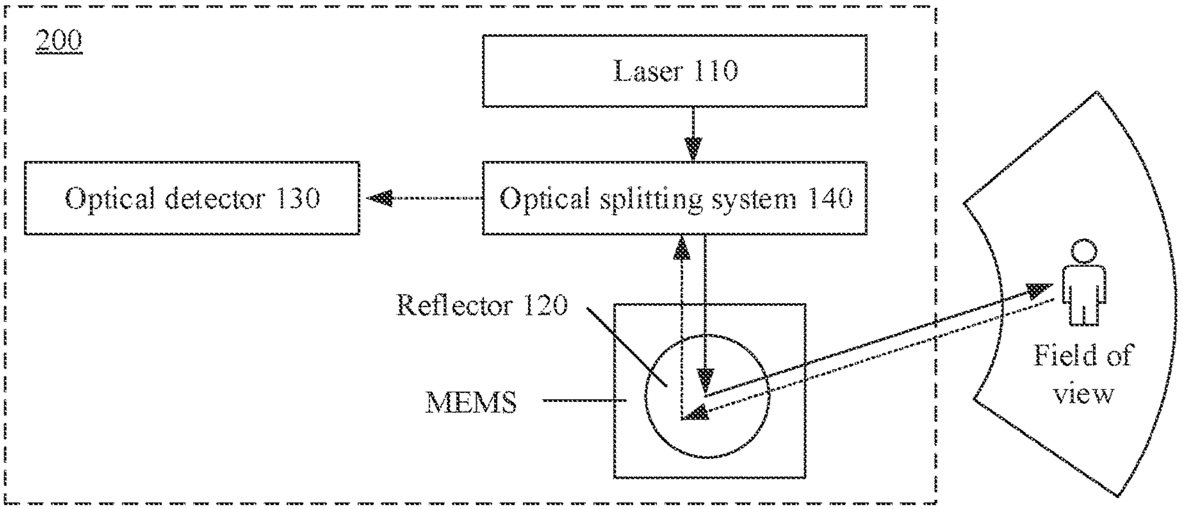
FIG. 2 is a schematic diagram of a structure of a lidar system.

FIG. 2 is a schematic diagram of a structure of a current lidar system.

A lidar system 200 includes a laser 110, a reflector 120, an optical detector 130, and an optical splitting system 140.

The laser 110 is configured to generate laser light. The laser light generated by the laser 110 is irradiated on the reflector 120.

The reflector 120 may be a reflector in a mechanical rotation scanning apparatus or a MEMS.

The mechanical rotation scanning apparatus includes a motor and a reflector. The motor is used to control rotation of the reflector, to control an emission direction of the laser light irradiated on the reflector. Compared with that in a manner of mechanical rotation scanning, in a manner of using the MEMS to implement scanning, a volume of a reflector driving apparatus can be reduced, so that the lidar system 200 can be applied to a terminal device with small space, such as a vehicle or an uncrewed aerial vehicle.

In FIG. 2, an example in which the reflector 120 is a MEMS micromirror, that is, the reflector 120 is located in the MEMS, is used for description. A reflector driving apparatus in the MEMS controls an angle of the reflector 120, to control an emission direction of the laser light irradiated on the reflector 120, so that the laser light implements scanning in a field of view.

In the field of view, a target located in a laser light transmission direction reflects the laser light, and reflected light is transmitted to the optical detector 130 by using the reflector 120. The optical detector 130 may be an optical detection element.

The optical splitting system 140 may split laser light generated by the laser into a reference beam and a measurement beam. The reference beam is transmitted to the optical detector 130. The measurement beam scans the field of view by using the reflector 120 for measuring an optical path, and an object in the field of view reflects the measurement beam. The measurement beam reflected by the object in the field of view is transmitted to the optical detector 130 by using the optical splitting system 140. A distance between the lidar system 200 and the object may be determined based on the reference beam and the measurement beam that are received by the optical detector 130.

The measured beam reflected by the object in the field of view may be coherently superposed with the reference beam on the optical detector 130, to form an interference fringe pattern. A phase difference between the reference beam and the measurement beam may be determined based on the interference fringe pattern. The distance between the lidar system 200 and the object may be determined based on a wavelength of the laser light and the phase difference.

Alternatively, laser light sent by the laser may be a laser pulse. In other words, both the reference beam and the measurement beam are laser pulses. Time of flight (time of flight, TOF) of a pulse may be used for ranging. The optical detector 130 may calculate the distance between the lidar system 200 and the object based on a time interval between a moment of receiving the reference light beam and a moment of receiving the measurement light beam, that is, a round-trip time period from a moment at which the measurement light beam is emitted from the optical splitting system 140 to a moment at which the measurement light beam is reflected by the object in the field of view and transmitted to the optical detector 130.

In the lidar system 200, laser light is emitted and received through reflection of the reflector 120. An emission path of the laser light is the same as an emission path. The lidar system 200 may be understood as a coaxial system.

Figure 3:
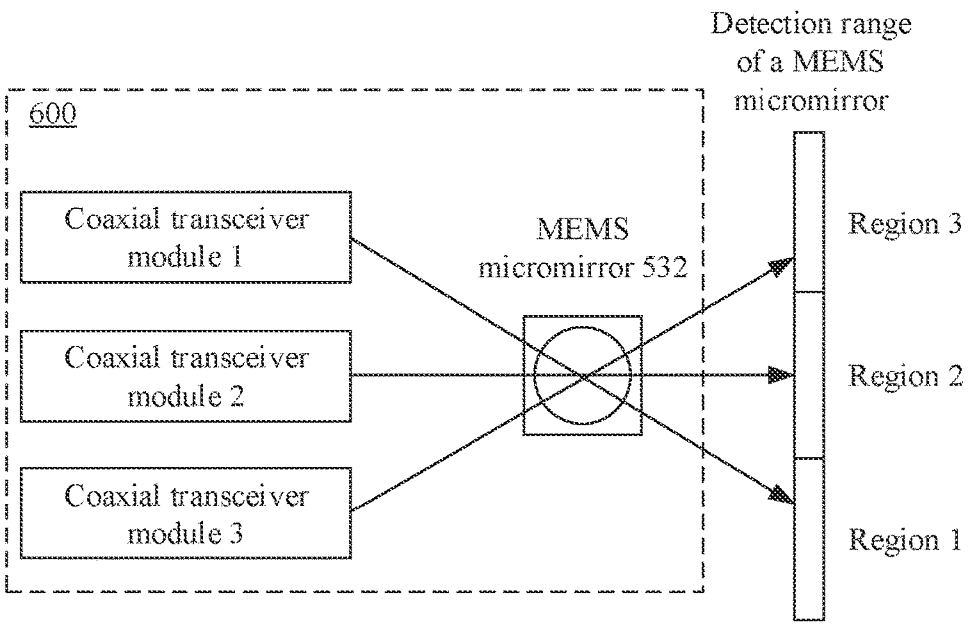
FIG. 3 is a schematic diagram of a structure of a detection apparatus.

In a detection apparatus 600 shown in FIG. 3, a detection range of the detection apparatus 600 may be increased by increasing a quantity of lasers. An example in which a MEMS micromirror 532 is used for laser scanning and laser receiving is used for description.

The detection apparatus 600 includes coaxial transceiver modules 1 to 3 and the MEMS micromirror 532. The coaxial transceiver modules 1, 2, and 3 are in a one-to-one correspondence with a region 1, a region 2, and a region 3. A detection range of the MEMS micromirror 532 includes the region 1, the region 2, and the region 3.

Each coaxial transceiver module includes a laser and an optical detector. Laser light emitted by each coaxial transceiver module is reflected by the MEMS micromirror 532, and is emitted to a region that is in a field of view and that corresponds to the coaxial transceiver module. A target in each region reflects the laser light, and reflected light of the laser light is reflected, by the MEMS micromirror 532, to a coaxial transceiver module corresponding to the region.

Due to factors such as stability, a mirror size of the MEMS micromirror cannot be large, and is generally only of a few millimeters. When the MEMS micromirror in the MEMS is configured to receive the reflected light of the laser light by the target, because a receiving aperture is small, received energy of a signal reflected by the laser light is small. Therefore, long-distance measurement cannot be implemented, and application of a MEMS-based lidar system is limited.

Figure 4:
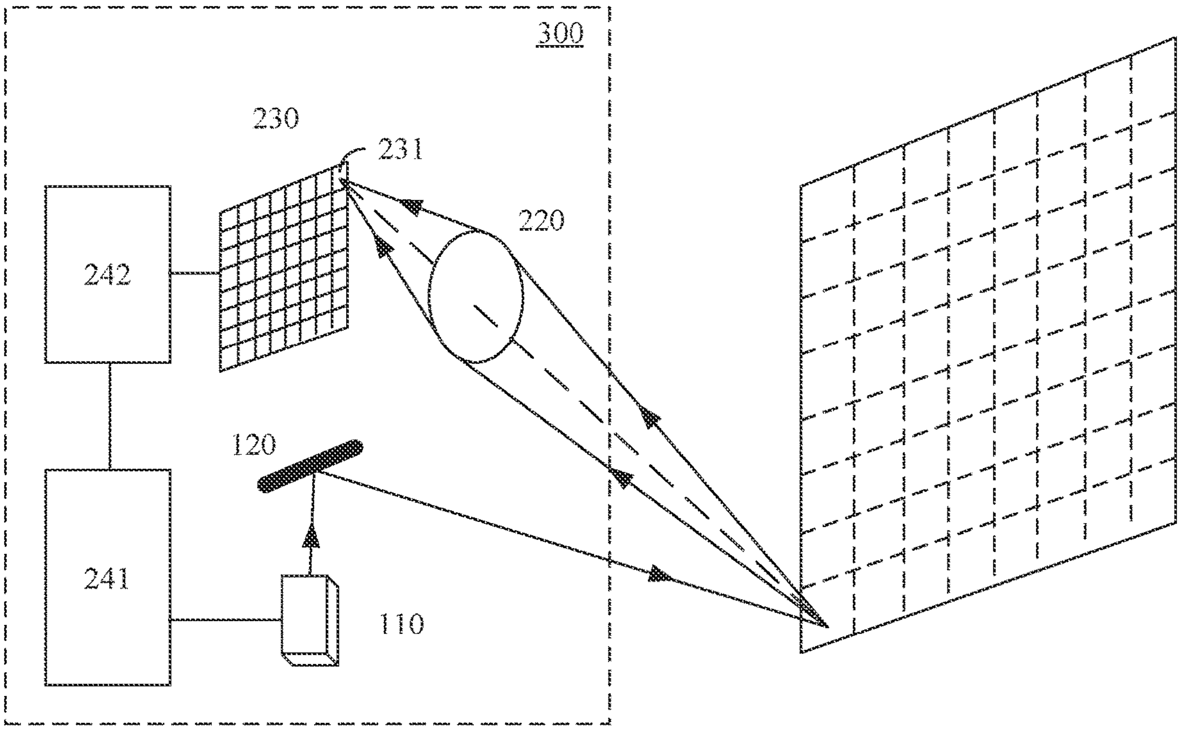
FIG. 4 is a schematic diagram of a structure of another lidar system.

FIG. 4 is a schematic diagram of a structure of a lidar system.

A lidar system 300 includes a laser 110, a reflector 120, a receiving optical lens 220, a planar array detector 230, a control module 241, and a signal processing module 242.

The control module 241 is configured to control the laser 110 to generate laser light. The laser light generated by the laser 110 is irradiated on the reflector 120 in a MEMS.

The control module 241 may be further configured to obtain a direction of the reflector 120, and control, based on the direction of the reflector 120, the laser to emit laser light, so that the laser light implements scanning in a field of view. Alternatively, the control module 241 may be further configured to control a direction of the reflector 120, to control an emission direction of laser light, so that scanning of the laser light in a field of view is implemented.

In the field of view, a target located in a laser light transmission direction reflects the laser light, and reflected light is transmitted to a detection unit 231 in the planar array detector 230 by using the receiving optical lens 4.

Optionally, ranging may be performed based on time of flight of a pulse or a phase difference.

The signal processing module 242 obtains a signal of each detection unit 231 in the planar array detector 230, and performs subsequent processing, for example, forming a depth map of the field of view.

The detection unit 231 may be one of optical detection elements having a photoelectric conversion capability, such as a silicon photo multiplier (silicon photo multiplier, SiPM), an avalanche photo diode (avalanche photo diode, APD), a photo multiplier tube (photo multiplier tube, PMT), a charge-coupled device (charge-coupled device, CCD), and a photodiode.

The receiving optical lens 220 is used in the lidar system 300. The receiving optical lens 220 has a large receiving aperture. Therefore, more echo energy can be received, and the receiving optical lens 220 can be used to implement long-distance measurement.

The reflector 120 in the MEMS does not need to undertake a function of receiving reflected light of laser light by the target. Therefore, a small-sized and light-weighted reflector 120 may be used.

According to the lidar system 300, a receiving path of laser light is different from an emission path of the laser light. The lidar system 300 may be referred to as an off-axis system.

Figure 5:
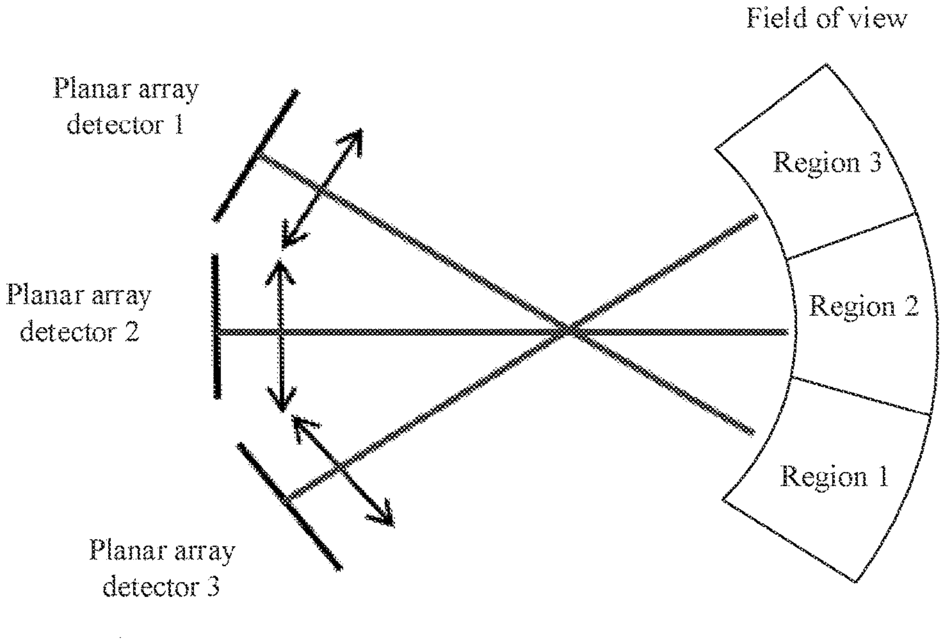
FIG. 5 is a schematic diagram of a structure of still another lidar system.

To implement distance measurement in a large field of view, more detection units may be used. During distance measurement in a large field of view, detection needs to be performed on more laser light transmission directions. Each detection unit in the planar array detector may receive and detect reflected light of laser light transmitted along a laser light transmission direction within a detection range of the lens assembly. Therefore, a quantity of detection units needs to be increased during distance measurement in a large field of view. For example, more planar array detectors may be used, and each planar array detector is responsible for detecting one region in the field of view. As shown in FIG. 5, a planar array detector 1 corresponds to a region 1, a planar array detector 2 corresponds to a region 2, and a planar array detector 3 corresponds to a region 3. A quantity of planar array detectors in the lidar system is increased. Consequently, a lidar system volume is increased, and costs are increased.

To resolve the foregoing problem and reduce costs of a lidar system, an embodiment of this application provides a lidar system.

Figure 6:
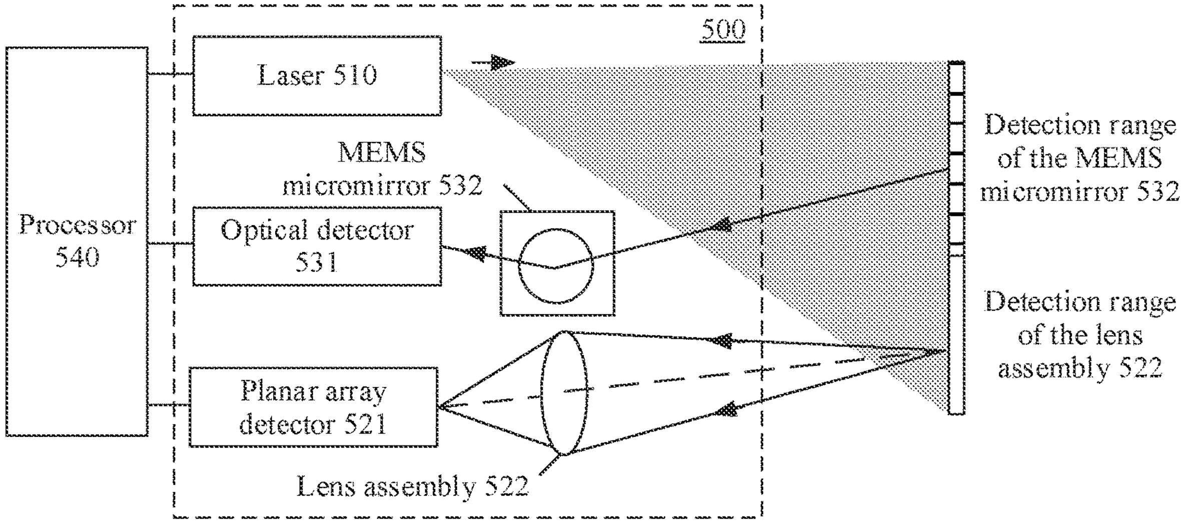
FIG. 6 is a schematic diagram of a structure of a detection apparatus according to an embodiment of this application.

FIG. 6 is a schematic diagram of a structure of a detection apparatus according to an embodiment of this application.

A detection apparatus 500 includes at least one laser 510, at least one planar array detector 521, at least one lens assembly 522, at least one optical detector 531, and at least one MEMS micromirror 532.

The lens assembly 522 is configured to focus reflected light of at least one first laser light beam to the planar array detector 521, and the reflected light of the at least one first laser light beam is located within a detection range of the lens assembly 522.

The MEMS micromirror 532 is configured to reflect reflected light of at least one second laser light beam to the optical detector 531, and the reflected light of the at least one second laser light beam is within a detection range of the MEMS micromirror 532.

The at least one first laser light beam and the at least one second laser light beam are emitted by using the at least one laser 510.

It should be understood that the lens assembly 522 includes one or more optical lenses. The optical detector 531 is located outside the at least one planar array detector 521.

Laser light is emitted from the detection apparatus. After a target located in an emission optical path of the laser light reflects the laser light, reflected light of the laser light is transmitted to the detection apparatus 500 along a reflection optical path that coincides with or approximately coincides with the emission optical path. In other words, the reflection optical path of the laser light coincides with or approximately coincides with the emission optical path of the laser light.

A detection range of the lens assembly 522 may be understood as a range of an emission optical path (which may also be understood as a reflection optical path) of laser light that can be transmitted to the planar array detector 521 after being focused by the lens assembly 522.

The MEMS micromirror 532 is located in a MEMS. Further optionally, the MEMS further includes a driving apparatus. The driving apparatus may control an orientation (which may also be understood as a direction or an angle of the MEMS micromirror 532) of the MEMS micromirror 532 in a manner such as electromagnetic driving, electrostatic driving, or electrothermal driving. It should be noted herein that the foregoing driving apparatus may alternatively control the micromirror in another possible manner. This is not specifically limited in this application.

A detection range of the MEMS micromirror 532 may be understood as an optical path range of laser light that can be transmitted to the optical detector 531 after being reflected by the MEMS micromirror 532 in a process of changing an orientation of the MEMS micromirror 532. It should be understood that the optical path range of the laser light may alternatively be understood as a direction range or an angle range of the laser light.

A detection range of the detection apparatus 500 may alternatively be referred to as a field of view of the detection apparatus 500, and includes the detection range of the MEMS micromirror 532 and the detection range of the lens assembly 522. Each of the lasers 510 is configured to generate laser light. The laser light generated by the at least one laser is emitted to a field of view of the detection apparatus 500. The detection apparatus 500 may perform detection on all directions in the field of view. Ranging may be performed on all the directions based on detection results of all the directions, to form a depth map.

The MEMS micromirror 532 is a reflector in the MEMS. The MEMS includes a driving apparatus and a MEMS micromirror. The driving apparatus is configured to adjust a direction of the MEMS micromirror. Optionally, the driving apparatus in the MEMS may adjust a vibration frequency of the MEMS micromirror, to change a scanning periodicity of the MEMS micromirror. Optionally, the driving apparatus in the MEMS may adjust a direction range of the MEMS micromirror, so that a detection range of the MEMS micromirror 532 may be adjusted.

The optical detector 531 is configured to convert a received optical signal into an electrical signal. The planar array detector 521 includes a plurality of detection units, and each detection unit is configured to convert a received optical signal into an electrical signal.

The detection apparatus 500 may further include a processor 540. Alternatively, the lidar system may include the detection apparatus 500 and a processor 540.

The processor 540 may include a control module, a signal processing module, and/or the like. The control module and the signal processing module may be located in a same chip or different chips. The control module is configured to control the at least one laser to emit laser light. The signal processing module is configured to obtain signals of all detection units in the planar array detector 521, to determine distances in all directions within the detection range of the lens assembly 522. The signal processing module is further configured to obtain signals of the optical detector 531 when the MEMS micromirror 532 faces all directions, to determine distances in all directions within the detection range of the MEMS micromirror 532.

Further, the signal processing module may further form a depth map of the detection range of the lens assembly 522 based on the distances in all directions within the detection range of the lens assembly 522, and/or the signal processing module may form a depth map of the detection range of the MEMS micromirror 532 based on the distances in all directions within the detection range of the MEMS micromirror 532.

The processor 540 may send indication information to the MEMS, to indicate a driving apparatus in the MEMS to adjust a scanning periodicity, a detection range, and/or the like of the MEMS micromirror.

For a detection apparatus that does not need to perform long-distance ranging on all directions but performs long-distance ranging only on some specific ranges, to reduce costs, the detection range of the MEMS micromirror 532 may include a region in which long-distance ranging does not need to be performed. The MEMS micromirror may be used to transmit, to the optical detector, reflected light that is of laser light and that is reflected by a target in the region in which long-distance ranging does not need to be performed. However, the detection range of the lens assembly 522 may include a region in which long-distance ranging needs to be performed. The lens assembly may be used to transmit, to the planar array detector, reflected light that is of laser light and that is reflected by a target in the region in which long-distance ranging needs to be performed.

The region in which long-distance ranging needs to be performed may be understood as a region in which a distance that needs to be measured exceeds an effective detection distance of the MEMS micromirror 532, that is, a maximum distance of a signal that can be identified by the optical detector 531 when the MEMS 532 is used to reflect laser light. The effective detection distance of the MEMS micromirror 532 is related to a mirror size, laser light intensity, and the like of the MEMS micromirror 532. On a premise that other conditions remain unchanged, the effective detection distance of the MEMS micromirror 532 is increased as a mirror size of the MEMS micromirror 532 is increased, or as laser intensity of the MEMS micromirror 532 is increased.

The detection apparatus 500 may implement a dual detection mode, to perform long-distance detection.

During detection, each detection unit in the planar array detector may receive and detect reflected light that is of laser light transmitted along a laser light transmission direction and that is within the detection range of the lens assembly. The MEMS micromirror may reflect reflected light that is of laser light transmitted in all laser light transmission directions and that is within the detection range of the MEMS micromirror, so that the optical detector can receive and detect the reflected light of the laser light transmitted in all the laser light transmission directions.

During detection, the reflected light of the laser light in different regions is separately received in the two manners: the MEMS micromirror and the lens assembly, so that a requirement for a quantity of optical detection elements in the detection apparatus can be reduced.

All detection units in the optical detector and the planar array detector are optical detection elements. The optical detection element has an optical-to-electrical conversion capability, and may be a SiPM, an APD, a PMT, a CCD, a photodiode, or the like.

Compared with a quantity of detection units of each planar array detector in the lidar system shown in FIG. 5, because the optical detector may receive and detect reflected light of laser light in a plurality of laser light transmission directions, a quantity of optical detection elements in the detection apparatus 500 is small. The detection apparatus 500 has a small volume and causes low costs while implementing long-distance detection.

Generally, a maximum diameter that may be used by the MEMS micromirror 532 is about 5 millimeters, and the effective detection distance of the MEMS micromirror 532 is about 100 meters within a laser intensity range that ensures safety of human eyes. With evolution of technologies, a size of a MEMS micromirror may be larger, to achieve better performance.

The detection apparatus 500 may be applied to the autonomous driving field. The detection apparatus 500 may be installed around an uncrewed vehicle or on a top of the vehicle. In a driving process of a vehicle, more attention is usually paid to a driving direction of the vehicle, that is, whether there is a target in front of the driving vehicle, and a distance from the target. Therefore, in the autonomous driving field, the detection range of the lens assembly 522 may include a region in front of a vehicle. The detection range of the MEMS micromirror 532 may be a region corresponding to another direction.

It should be understood that laser light emitted by the at least one laser 510 may be emitted to a field of view in a scanning or non-scanning manner. In other words, the laser light may be emitted from the detection apparatus in a scanning or non-scanning manner.

In the non-scanning manner, a plurality of lasers 510 may form an array light source to emit laser light into the field of view. When the detection apparatus 500 emits laser light in a non-scanning manner, the laser light emitted by the plurality of lasers 510 may be directly emitted out of the detection apparatus 500 without being reflected inside the detection apparatus 500.

In the scanning manner, scanning may be performed in a mechanical rotation manner, a MEMS-based manner, or the like. When the detection apparatus 500 emits laser light in the scanning manner, the detection apparatus 500 includes a reflector. Laser light emitted by the laser 510 is emitted out of the detection apparatus 500 after being reflected by the reflector. The field of view can be scanned by adjusting a direction of the reflector.

Compared with that in the non-scanning manner, laser emission in the scanning manner can reduce a quantity of lasers in the detection apparatus 500, so that costs are reduced.

A mechanical rotation scanning apparatus includes a motor and a reflector. The motor controls rotation of the reflector, to change an optical path of laser light and change a direction in which laser light irradiated on the reflector is emitted out of the detection apparatus 500, to implement scanning in all directions in the field of view. Compared with that in a mechanical rotation scanning manner, a micro electro mechanical scanning system is used for a small volume, more flexible scanning direction control, and higher anti-vibration reliability in a MEMS-based scanning manner.

In the MEMS-based scanning manner, the MEMS micromirror 532 may be further configured to reflect the at least one second laser light beam, to scan the detection range of the MEMS micromirror 532. In other words, the MEMS micromirror 532 may be further configured to emit laser light out of the detection apparatus 500.

When the detection apparatus 500 emits the second laser light, the MEMS micromirror 532 reflects the second laser light emitted by the laser, so that the second laser light is emitted out of the detection apparatus 500. An object within the detection range of the MEMS micromirror 532 reflects the second laser light. When reflected light that is of the second laser light and that is reflected by the object is transmitted to the detection apparatus 500, the MEMS micromirror 532 reflects the reflected light of the second laser light, so that the reflected light that is of the second laser light and that is reflected by the object is transmitted to the planar array detector 521. In other words, detection may be performed in a coaxial manner within the detection range of the MEMS micromirror 532.

When the detection apparatus 500 performs laser emission in the scanning manner, detection is performed in a coaxial manner within the detection range of the MEMS micromirror 532. The MEMS micromirror 532 is used in a phase in which the second laser light is emitted out of the detection apparatus 500, and is used in a receiving phase in which the detection apparatus 500 transmits the reflected light of the second laser light, so that a quantity of reflectors in the detection apparatus can be reduced, a volume of the detection apparatus can be reduced, and costs of the detection apparatus can be reduced.

It should be understood that, in a phase in which laser light emits out of the detection apparatus 500, a same MEMS micromirror or different MEMS micromirrors may be used within the detection range of the MEMS micromirror 532 and the detection range of the lens assembly 522. In other words, when the detection apparatus 500 performs laser scanning within the detection range of the lens assembly 522 in the MEMS-based scanning manner, the MEMS micromirror 532 may be used to reflect the at least one first laser light, and a direction of the MEMS micromirror 532 is adjusted, to perform scanning within the detection range of the lens assembly 522.

For example, when the detection apparatus 500 emits first laser light, the MEMS micromirror 532 may further reflect the first laser light, so that the first laser light is emitted out of the detection apparatus 500. An object within the detection range of the lens assembly 522 reflects the first laser light. The lens assembly 522 focuses reflected light that is of the first laser light and that is reflected by the object, so that the reflected light of the first laser light is transmitted to the planar array detector 521. In other words, distance detection may be performed in an off-axis manner within the detection range of the lens assembly 522.

For another example, when the detection apparatus 500 emits laser light, a same MEMS micromirror 532 is used to reflect laser light generated by the laser, to perform scanning within the detection range of the MEMS micromirror 532 and the detection range of the lens assembly 522. In other words, a same MEMS micromirror 532 is used to implement scanning within the detection range of the MEMS micromirror 532 and the detection range of the lens assembly 522, so that a quantity of MEMS micromirrors can be reduced, power consumption can be reduced, and costs can be reduced.

It should be understood that there may be or may not be overlapping between the detection range of the MEMS micromirror 532 and the detection range of the lens assembly 522. For details, refer to descriptions in FIG. 7 to FIG. 9.

In an optional design, in the detection apparatus 500, there may be one or more MEMS micromirrors 532. When the detection apparatus 500 includes a plurality of MEMS micromirror 532, directions of the plurality of MEMS micromirrors are the same when the reflected light of the at least one second laser light beam is reflected.

Compared with that in a manner in which one MEMS micromirror 532 performs reflection, in a manner in which the reflected light that is of the second laser light and that is reflected by the object is transmitted to the detection apparatus 500 and a plurality of MEMS micromirrors 532 in a same direction are used to reflect the reflected light of the second laser light to the optical detector 521, an area of a reflector is increased, so that energy of the reflected light that is of the second laser light and that is received by the optical detector 521 is increased. In this way, an effective detection distance is increased when the MEMS micromirror 532 is used for coaxial detection. In other words, an effective detection distance of the detection apparatus for the detection range of the MEMS micromirror 532 is increased.

To reduce a quantity of reflectors in the detection apparatus, reduce a volume of the detection apparatus, and reduce costs of the detection apparatus, the plurality of MEMS micromirrors 532 may be further used in a phase in which the first laser light and/or the second laser light are/is emitted out of the detection apparatus 500. When the second laser light is emitted out of the detection apparatus 500, directions of the plurality of MEMS micromirrors 532 are adjusted, so that the second laser light is emitted out of the detection apparatus 500 after being reflected by the plurality of MEMS micromirrors 532 in a same direction, to implement scanning within the detection range of the MEMS micromirror 532. When the first laser light is emitted out of the detection apparatus 500, directions of the plurality of MEMS micromirrors 532 are adjusted, so that the first laser light is emitted out of the detection apparatus 500 after being reflected by the plurality of MEMS micromirrors 532 in a same direction, to implement scanning within the detection range of the lens assembly 522.

Optionally, a focal length of the lens assembly 522 is adjustable, so that optical zoom can be implemented.

If the focal length of the lens assembly 522 changes, ranges of a reflection optical path and an emission optical path of laser light received by the lens assembly 522 change, that is, the detection range of the lens assembly 522 changes.

In a process of adjusting the focal length of the lens assembly 522, a laser scanning density within the detection range of the lens assembly 522 may be adjusted. In other words, when the focal length of the lens assembly 522 changes, a depth map is generated based on a distance between a target within the detection range the lens assembly 522 and the lens assembly 522, and a resolution of the depth map may also change.

When the focal length of the lens assembly 522 is increased, if a scanning density the same as that before the focal length is increased is used to scan a same range, the scanning density may be excessively low, and a large interval between two adjacent scanning directions cannot accurately reflect a distance between a target within the detection range of the lens assembly 522 and the detection apparatus 500. There may be a case in which accurate detection cannot be performed because the target is located between the two adjacent scanning directions.

Therefore, when the focal length of the lens assembly 522 is increased, a laser scanning density within the detection range of the lens assembly 522 may be increased, to improve accuracy of a detection result.

An example in which the MEMS micromirror 532 or another reflector is used to perform laser light scanning within the detection range of the lens assembly 522 is used for description. A control module may obtain an orientation of a reflector. When the orientation of the reflector is a preset orientation, the laser 510 is controlled to emit the first laser light. A plurality of preset orientations are included within the detection range of the lens assembly 522.

The focal length of the lens assembly 522 and a preset orientation set may be in a one-to-one correspondence. Each preset orientation set includes a plurality of preset orientations. A preset orientation set corresponding to a focal length of the lens assembly 522 may be determined based on the focal length of the lens assembly 522. A larger focal length of the lens assembly 522 indicates a higher density of the plurality of preset orientations in the preset orientation set corresponding to the focal length.

In other words, different focal lengths of the lens assembly 522 may correspond to densities of different preset orientations within the detection range of the lens assembly 522. When the focal length of the lens assembly 522 is increased, a density of a preset orientation within the detection range of the lens assembly 522 is increased, so that a laser scanning density within the detection range of the lens assembly 522 is increased.

Optionally, the control module may obtain a current focal length of the lens assembly 522, and determine a plurality of preset orientations that are of a reflector within the detection range of the lens assembly 522 and that correspond to the current focal length of the lens assembly 522.

Adjustment of the laser scanning density causes a change in the resolution of the depth map generated by the planar array detector 521, that is, a change in an angle corresponding to each optical detector in the planar array detector 521.

Generally, a size of the planar array detector 521 and a quantity of detection units in the planar array detector 521 are fixed. To achieve a maximum resolution in each case of different focal lengths of the lens assembly 522, quantities of preset orientations in all preset orientation sets corresponding to different focal lengths of the lens assembly 522 are the same, and are equal to the quantity of detection units in the planar array detector 521.

The control module may adjust the laser scanning density based on the focal length of the lens assembly 522. A longer focal length of the lens assembly 522 indicates a higher laser scanning density, so that the detection range of the lens assembly 522 is smaller and the resolution is higher. On the contrary, a shorter focal length of the lens assembly 522 indicates a lower laser scanning density, so that the detection range of the lens assembly 522 is larger and the resolution is lower.

In the detection apparatus 500, when the quantity of detection units in the planar array detector 521 remains unchanged, the detection range of the lens assembly 522 may be changed through zoom adjustment for the lens assembly 522 and laser scanning density adjustment, and resolution adjustment may be implemented, to meet requirements in different ranging scenarios.

Optionally, when the laser scanning density changes with the focal length of the lens assembly 522, there may be no blind region between the detection range of the lens assembly 522 and the detection range of the MEMS micromirror 532. In this way, detection results are continuous in regions. When the detection apparatus is applied to a field such as the autonomous driving field, safety can be improved.

The detection range of the MEMS micromirror 532 may remain unchanged. The detection range of the MEMS micromirror 532 is in contact with a detection range of a smallest lens assembly 522. In this way, regardless of detection ranges of various lens assemblies 522, there is no blind region between the detection range of the lens assembly 522 and the detection range of the MEMS micromirror 532.

Optionally, the detection range of the MEMS micromirror 532 is adjustable. When the detection range of the lens assembly 522 becomes smaller, the detection range of the MEMS micromirror 532 may be increased, so that a blind region between the detection range of the lens assembly 522 and the detection range of the MEMS micromirror 532 can be avoided.

Adjustment of the detection range of the MEMS micromirror 532 may match adjustment of the detection range of the lens assembly 522, so that there is no blind region and overlapping between the detection range of the lens assembly and the detection range of the MEMS micromirror.

In an optional design, the processor 540 may adjust the detection range of the MEMS micromirror 532 based on the detection range of the lens assembly 522. Further, an angle range of the MEMS micromirror 532 may be adjusted, to adjust a scanning range of laser light emitted by each laser and the detection range of the MEMS micromirror 532, so that the detection range of the MEMS micromirror 532 is in contact with and does not overlap with the detection range of the lens assembly 522.

The detection range of the MEMS micromirror 532 is in contact with and does not overlap the detection range of the lens assembly 522, so that performance of the detection apparatus 500 can be improved.

Specifically, the processor 540 may adjust the focal length of the lens assembly 522 based on information input by a user. Alternatively, the processor 540 may determine the focal length of the lens assembly 522 based on a depth of a target within the detection range of the lens assembly 522 in a previous-frame depth map. When a distance of the target within the detection range of the lens assembly 522 in the previous-frame depth map is short, a small focal length may be used. Alternatively, when a distance of the target within the detection range of the lens assembly 522 in the previous-frame depth map is long, a large focal length may be used. In other words, the focal length of the lens assembly 522 may be determined based on the previous-frame depth map.

The detection apparatus 500 may be applied to the autonomous driving field. The processor 540 may further determine the focal length of the lens assembly 522 based on a vehicle speed. For example, the detection apparatus 500 may use a large focal length when the vehicle speed is high (for example, the vehicle speed is greater than a preset value), to ensure driving safety of the vehicle.

The at least one first laser light beam may be emitted by at least one first laser in the at least one laser 510. The at least one second laser light beam may be emitted by at least one second laser in the at least one laser 510. The at least one first laser may be different from the at least one second laser, or the at least one first laser and the at least one second laser may include at least one same laser.

In some embodiments, when the at least one first laser and the at least one second laser may include at least one same laser, the same laser is configured to emit first laser light, to scan all or some regions within the detection range of the MEMS micromirror 532, and is further configured to emit second laser light, to scan all or some regions within the detection range of the lens assembly 522.

When the focal length of the lens assembly 522 is adjustable, and the laser scanning density within the detection range of the lens assembly 522 changes with the focal length of the lens assembly 522, a laser scanning density within the detection range of the MEMS micromirror 532 may be different from the laser scanning density within the detection range of the lens assembly 522. Consequently, control on the detection apparatus 500 is complex.

In some other embodiments, the at least one first laser is different from the at least one second laser. For the detection range of the MEMS micromirror 532 and the detection range of the lens assembly 522, different lasers are respectively used to emit laser light for detection, so that control difficulty can be reduced.

In an implementation, a laser light beam generated by a laser may pass through a collimator to form a parallel light beam before being emitted to a field of view outside the detection apparatus 500.

The collimator is an optical element that is for input and output and that is of an optical fiber communication optical component. Divergent light generated by the laser forms a parallel light beam (a Gaussian light beam) through the collimator. The collimator may include an optical element such as a convex lens.

The collimator may be located, for example, between the laser 510 and the MEMS micromirror 532.

In the detection apparatus 500, the lasers 510 may be in a one-to-one correspondence with the collimators. To be specific, divergent light generated by each laser forms a parallel light beam through a collimator corresponding to the laser. The detection apparatus 500 may further include an optical splitting system. The optical splitting system is located in a coaxial transceiver module. Alternatively, there may be another corresponding manner between the laser and the collimator.

Figure 7:
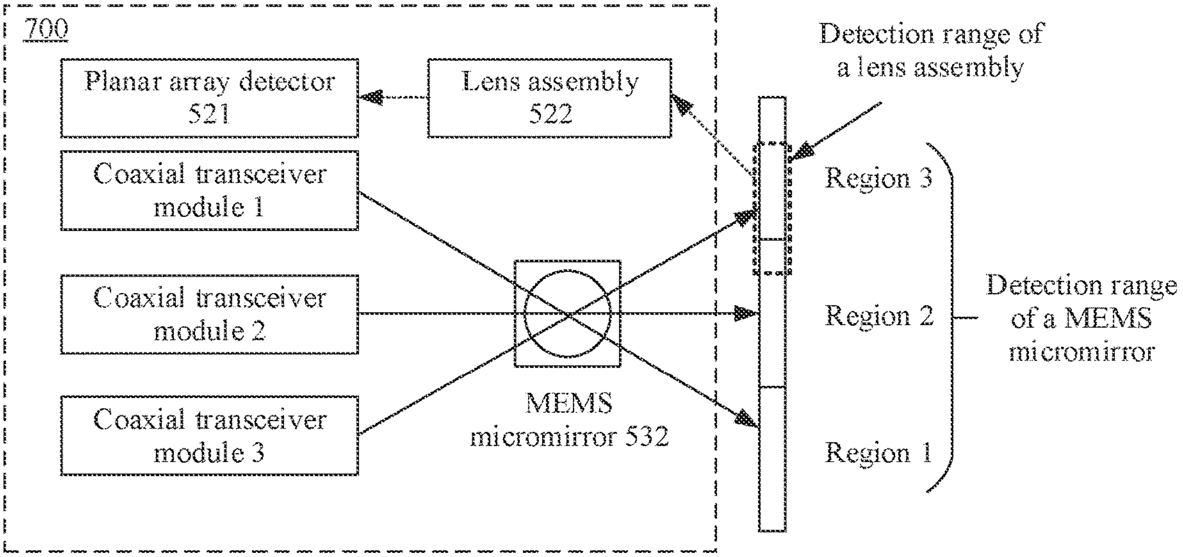
FIG. 7 is a schematic diagram of a structure of another detection apparatus according to an embodiment of this application.

FIG. 7 is a schematic diagram of a structure of a detection apparatus according to an embodiment of this application.

A detection apparatus 700 includes a coaxial transceiver module 1 to a coaxial transceiver module 3, a MEMS micromirror 532, a planer array detector 521, and a lens assembly 522. The lens assembly 522 is configured to focus, to the planar array detector 521, reflected light that is of laser light and that is reflected by a target within a detection range of the lens assembly 522. For a specific function of the assembly, refer to FIG. 6 and the foregoing explanations. Details are not described herein again.

The detection range of the lens assembly 522 may be located in any region around or within a detection range of the MEMS micromirror 532. Optionally, the detection range of the MEMS micromirror 532 may include the detection range of the lens assembly 522.

Each coaxial transceiver module includes at least one laser 510 and one optical detector 531. For each coaxial transceiver module, after laser light emitted by the at least one laser 510 is emitted out of the coaxial transceiver module, the laser light is reflected by an object in a field of view. Reflected light that is of the laser light and that is reflected by the object is reversely transmitted to the coaxial transceiver module along an optical path the same (or approximately the same) as an optical path after the laser light is emitted out of the coaxial transceiver module.

Further optionally, each coaxial transceiver module may further include an optical splitting system. For details, refer to descriptions in FIG. 10 and FIG. 11.

For the detection apparatus 700, laser scanning ranges corresponding to the coaxial transceiver module 1 to the coaxial transceiver module 3 are the detection ranges of the MEMS micromirror 532. In other words, the detection range of the lens assembly 522 is located within the detection range of the MEMS micromirror 532.

To save computing resources, for a part that is in the laser scanning ranges corresponding to the coaxial transceiver module 1 to the coaxial transceiver module 3 and that overlaps the detection range of the lens assembly 522, a processor may no longer calculate a distance.

A focal length of the lens assembly 522 may be a fixed value, or may be adjustable.

In a coaxial transceiver module, an orientation adjustment range of the MEMS micromirror 532 is limited. In a case in which there is overlapping between the detection range of the lens assembly 522 and laser scanning ranges of at least two coaxial transceiver modules, when the focal length of the lens assembly 522 is adjustable and a laser scanning density within the detection range of the lens assembly 522 changes with the focal length of the lens assembly 522, a requirement for the laser scanning density within the detection range of the lens assembly 522 may be different from a requirement for a laser scanning density outside the detection range of the lens assembly 522.

In this case, if scanning is performed based on respective laser scanning densities within and outside the detection range of the lens assembly 522, control on the laser scanning density is complex.

If scanning is performed based on a larger value in the requirement for the laser scanning density within the detection range of the lens assembly 522 and the requirement for the laser scanning density outside the range, a data amount is increased, and a large quantity of processing resources are occupied.

Figure 8:
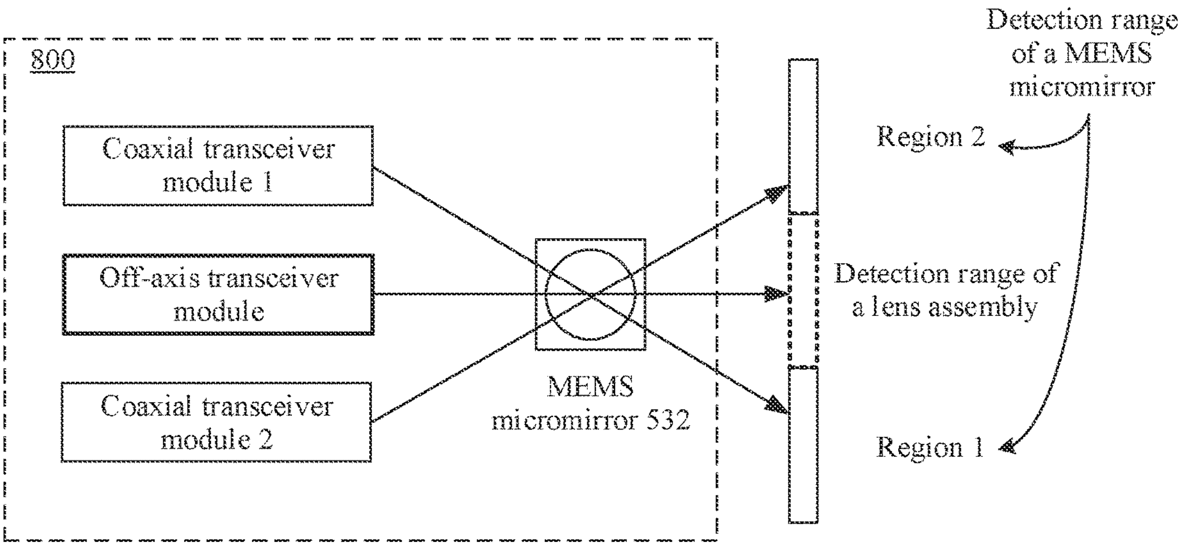
FIG. 8 is a schematic diagram of a structure of still another detection apparatus according to an embodiment of this application.

FIG. 8 is a schematic diagram of a structure of a detection apparatus according to an embodiment of this application.

A detection apparatus 800 may include a coaxial transceiver module 1, a coaxial transceiver module 2, a MEMS micromirror 532, and an off-axis transceiver module. The off-axis transceiver module includes a laser 510, a lens assembly 522, and a planar array detector 521. For a specific function of the assembly, refer to FIG. 6 and the foregoing explanations. Details are not described herein again.

In the detection apparatus 800, the coaxial transceiver module 1 and the coaxial transceiver module 2 respectively correspond to a region 1 and a region 2. A detection range of the MEMS micromirror 532 includes the region 1 and the region 2.

After being reflected by the MEMS micromirror 532, laser light generated by each laser 510 is emitted to a region that is in a field of view of the detection apparatus 800 and that corresponds to a transceiver module in which the laser 510 is located.

Laser light generated by the laser 510 in the off-axis transceiver module is emitted to a detection range of the lens assembly 522, laser light generated by the coaxial transceiver module 1 is emitted to the region 1, and laser light generated by the coaxial transceiver module 2 is emitted to the region 2.

In the off-axis transceiver module, the lens assembly 522 is configured to focus, to the planar array detector 521, reflected light that is of laser light and that is reflected by a target within the detection range of the lens assembly 522.

The detection range of the lens assembly and the detection range of the MEMS micromirror may overlap or may not overlap. In other words, a detection range of a lens assembly shown by dashed lines in FIG. 8 may overlap or may not overlap with the region 1 and the region 2.

A focal length of the lens assembly 522 may be a fixed value, or may be adjustable.

When a focal length of the lens assembly 522 is a fixed value, the detection range of the lens assembly may be in contact with but does not overlap the detection range of the MEMS micromirror, so that there is no blind region within a detection range of the detection apparatus 800. In addition, repeated calculation for a distance of a same region is avoided, and processing resource occupation is reduced.

When the focal length of the lens assembly 522 is adjustable, in a case in which the focal length of the lens assembly 522 is at a maximum value, that is, the detection range of the lens assembly is the smallest, the detection range of the lens assembly should be in contact with the detection range of the MEMS micromirror, so that a blind region within the detection range of the detection apparatus 800 can be avoided.

Optionally, a range of an orientation of the MEMS micromirror is adjustable. In other words, the detection range of the MEMS micromirror is adjustable. In this way, in a process in which the focal length of the lens assembly 522 changes, the detection range of the lens assembly may be in contact with but does not overlap the detection range of the MEMS micromirror, so that repeated calculation for a distance of a same region is avoided, and processing resource occupation is reduced.

In the detection apparatus 800, regions corresponding to the coaxial transceiver modules and the off-axis transceiver module are flexible in a splicing manner. When the detection apparatus 800 is designed, an adjacent region of a region corresponding to the off-axis transceiver module may be flexibly adjusted, based on an actual requirement, to a region corresponding to another off-axis transceiver module or a region corresponding to a coaxial transceiver module.

In the detection apparatus shown in FIG. 8, the region corresponding to the off-axis transceiver module is located between regions respectively corresponding to the two coaxial transceiver modules. Alternatively, for another detection apparatus, regions corresponding to two off-axis transceiver modules may be respectively located on two sides of regions respectively corresponding to coaxial transceiver modules.

Figure 9:
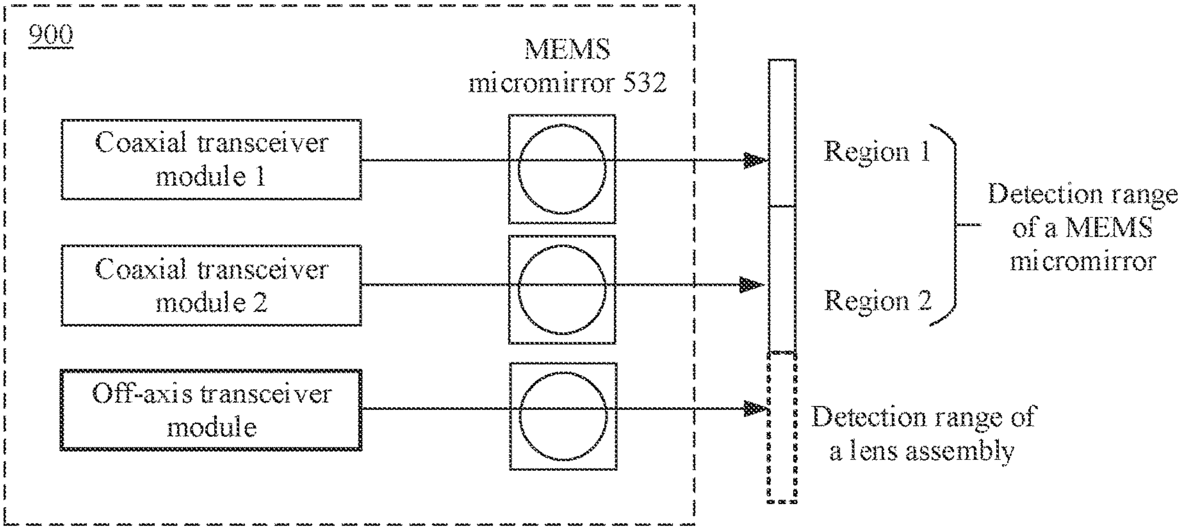
FIG. 9 is a schematic diagram of a structure of still another detection apparatus according to an embodiment of this application.

FIG. 9 is a schematic diagram of a structure of a detection apparatus according to an embodiment of this application.

A detection apparatus 900 may include a plurality of MEMS micromirrors 532, and each MEMS micromirror 532 may correspond to one or more transceiver modules. As shown in FIG. 9, each of the coaxial transceiver modules and the off-axis transceiver module corresponds to one MEMS micromirror 532. Each MEMS micromirror 532 is configured to: reflect, to a region that is within a detection range of the detection apparatus 900 and that corresponds to the transceiver module, laser light emitted by each transceiver module; and reflect, to the transceiver module, reflected light that is of the laser light and that is reflected by a target within the region. For a specific function of the assembly, refer to FIG. 6 and the foregoing explanations. Details are not described herein again.

Different MEMS micromirrors are used to reflect laser light emitted by all transceiver modules, to implement emission and receiving for the laser light. This can be flexibly and separately performed within a region corresponding to each transceiver module, to improve flexibility and convenience of controlling the detection apparatus.

Figure 10:
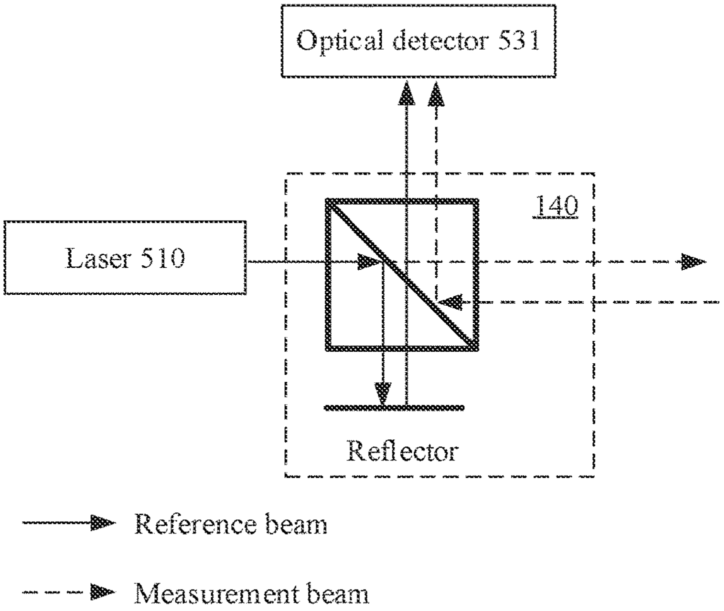
FIG. 10 is a schematic diagram of a structure of a coaxial transceiver module according to an embodiment of this application.

FIG. 10 is a schematic diagram of a structure of a coaxial transceiver module according to an embodiment of this application.

An optical splitting system 140 may include a beam splitter and a reflector. The beam splitter may alternatively be referred to as a semi-transmissive and semi-reflective mirror. According to a specific energy proportion, some light emitted into the beam splitter is transmitted and some light is reflected.

Laser light generated by the laser 510 is emitted into the beam splitter at an included angle of 45°. The beam splitter may split laser light generated by the laser into a reference beam and a measurement beam. The reference beam is a reflected beam, and the measurement beam is a transmitted beam. After being reflected by the reflector, the reference beam is transmitted to the optical detector 531 after passing through the beam splitter.

The measurement beam is emitted out of the detection apparatus 500, and is emitted into the beam splitter after being reflected by a target in the field of view. The beam splitter reflects the emitted measurement beam to the optical detector 531. The measurement beam and the reference beam are coherently superposed at the beam splitter, and form an interference fringe pattern at the optical detector 531. A phase difference between the reference beam and the measurement beam may be determined based on the interference fringe pattern.

Figure 11:
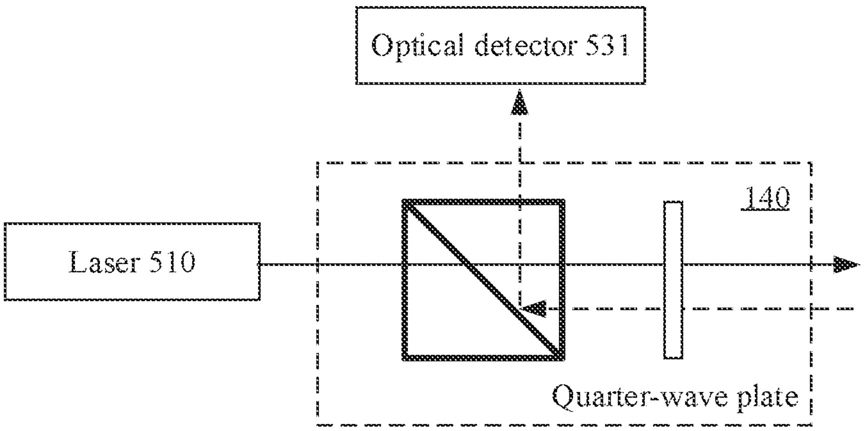
FIG. 11 is a schematic diagram of a structure of a coaxial transceiver module according to an embodiment of this application.

FIG. 11 is a schematic diagram of a structure of a coaxial transceiver module according to an embodiment of this application.

The optical splitting system 140 may alternatively include a polarization beam splitter and a quarter-wave plate.

The polarization beam splitter transmits linearly polarized light whose polarization direction is the same as a transmission direction of the polarization beam splitter, and reflects linearly polarized light whose polarization direction is perpendicular to a transmission direction of the polarization beam splitter.

Laser light generated by the laser 510 is linearly polarized light, and is emitted into the polarization beam splitter at an included angle of 45°. A polarization direction of the laser light generated by the laser 510 is the same as a transmission direction of the polarization beam splitter. After the laser beam is transmitted through the polarization beam splitter, the laser beam is converted into circularly polarized light or elliptically polarized light through the quarter-wave plate.

Then, the light is emitted, reflected by a target in the field of view, and emitted into the optical splitting system 140. The circularly polarized light or the elliptically polarized light is converted into linearly polarized light through the quarter-wave plate, and a polarization direction is perpendicular to a transmission direction of the polarization beam splitter. The linearly polarized light is reflected by the polarization beam splitter, and is transmitted to the optical detector 531.

A time difference between a moment at which the laser 510 emits the laser light and a moment at which the optical detector 531 receives the laser light is time of flight of the laser light.

The detection apparatus 500 may be located in a lidar system. The lidar system includes a detection apparatus 500 and a signal processing module. The signal processing module is configured to determine a distance between the detection apparatus 500 and a target based on a phase difference between a reference beam and a measurement beam, or time of flight of laser light.

The foregoing describes the detection apparatuses in embodiments of this application with reference to FIG. 1 to FIG. 11. The following describes a control method and control apparatus of the detection apparatus in embodiments of this application with reference to FIG. 12 to FIG. 14. It should be understood that descriptions of the detection apparatus correspond to descriptions of the control method and control apparatus of the detection apparatus. Therefore, for a part that is not described in detail, refer to the foregoing description of the detection apparatus.

Figure 12:
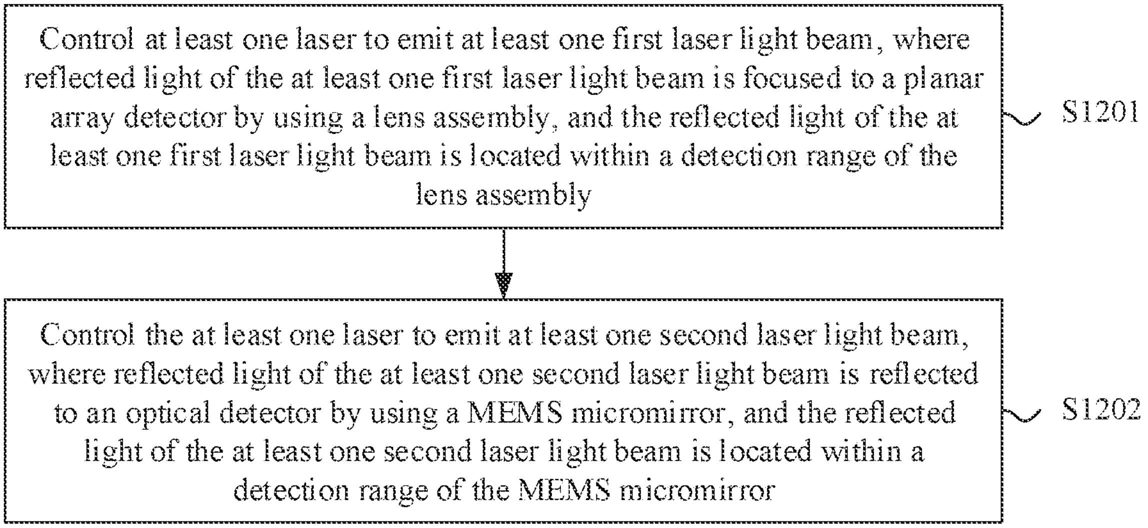
FIG. 12 is a schematic flowchart of a control method according to an embodiment of this application.

FIG. 12 is a schematic flowchart of a control method according to an embodiment of this application.

The control method may be applied to a detection apparatus, or may be understood as a control method of a detection apparatus. The detection apparatus includes at least one laser, at least one planar array detector, at least one lens assembly, at least one optical detector, and at least one micro electro mechanical system MEMS micromirror. Specifically, for the detection apparatus or composition thereof, refer to descriptions in FIG. 6 to FIG. 11.

The control method may be performed by a control apparatus. Optionally, the control apparatus may be located in the detection apparatus, or may be independent of the detection apparatus.

S1201: Control the at least one laser to emit at least one first laser light beam, where reflected light of the at least one first laser light beam is focused to the planar array detector by using the lens assembly, and the reflected light of the at least one first laser light beam is located within a detection range of the lens assembly.

S1202: Control the at least one laser to emit at least one second laser light beam, where reflected light of the at least one second laser light beam is reflected to the optical detector by the MEMS micromirror, and the reflected light of the at least one second laser light beam is located within a detection range of the MEMS micromirror.

For example, the control apparatus may generate control information, and send the control information to the detection apparatus, to control the laser in the detection apparatus to emit first laser light and second laser light.

The lens assembly is configured to receive reflected light of laser light, and can implement long-distance detection. The MEMS micromirror is configured to receive reflected light of laser light. A small quantity of optical detectors are required for detection (each laser requires only one optical detector corresponding to the laser), and costs for implementing detection are low.

In S1201 to S1202, the laser is controlled to emit the first laser light and the second laser light, and the detection apparatus separately receives reflected light of the first laser light and reflected light of the second laser light in two manners: the MEMS micromirror and the lens assembly. In this way, costs of the detection apparatus are reduced while long-distance ranging is implemented.

It should be understood that the detection range of the lens assembly does not fully overlap the detection range of the MEMS micromirror.

Optionally, a focal length of the lens assembly is adjustable, and when the focal length of the lens assembly is increased, a laser scanning density within the detection range of the lens assembly is increased.

When the focal length of the lens assembly is increased, the laser scanning density within the detection range of the lens assembly is increased, so that resolution of the detection range of the lens assembly can be improved, and accuracy of a detection result is improved.

Optionally, the at least one first laser light beam is emitted by at least one first laser in the at least one laser, and the at least one second laser light beam is emitted by at least one second laser in the at least one laser, where the at least one first laser is different from the at least one second laser.

When the focal length of the lens assembly is increased, if a scanning density the same as that before the focal length is increased is used to scan a same range, the scanning density may be excessively low, and a large interval between two adjacent scanning directions cannot accurately reflect a distance between a target within the detection range of the lens assembly and the detection apparatus. There may be a case in which accurate detection cannot be performed because the target is located between the two adjacent scanning directions. Therefore, when the focal length of the lens assembly is increased, a laser scanning density within the detection range of the lens assembly may be increased, to improve accuracy and reliability of a detection result.

For the detection range of the MEMS micromirror and the detection range of the lens assembly, different lasers are respectively used to emit laser light for detection, so that control difficulty can be reduced.

Optionally, there is no blind region between the detection range of the lens assembly and the detection range of the MEMS micromirror.

There is no blind region between the detection range of the lens assembly and the detection range of the MEMS micromirror, so that detection results are continuous in regions, so that reliability of a detection result is improved.

Optionally, the detection range of the MEMS micromirror and/or the detection range of the lens assembly may be further adjusted, so that there is no overlapping between the detection range of the lens assembly and the detection range of the MEMS micromirror.

There is no overlapping between the detection range of the MEMS micromirror and the detection range of the lens component, so that repeated calculation and processing for detection results in a same direction is avoided, and resource occupation is reduced.

Specifically, adjustment information may be sent to the detection apparatus, to indicate the detection apparatus to adjust the detection range of the MEMS micromirror and/or the detection range of the lens assembly.

Particularly, when the focal length of the lens assembly is adjustable, and a laser scanning density of the detection range of the lens assembly changes with the focal length, because a quantity of detection units in the planar array detector is fixed, a larger laser scanning density indicates a smaller detection range of the lens assembly.

Therefore, a preset orientation set corresponding to a focal length of the lens assembly may be determined based on the focal length of the lens assembly, that is, a detection range that is of the lens assembly and that corresponds to the focal length is determined. In this way, the detection range of the MEMS micromirror may be adjusted based on the detection range of the lens assembly, so that there is no overlapping between the detection range of the lens assembly and the detection range of the MEMS micromirror.

When the detection apparatus emits the first laser light to the detection range of the lens assembly in a scanning manner, an orientation of the MEMS micromirror or another reflector may be obtained. When an orientation of a reflector is a preset orientation, a laser is controlled to emit the first laser light. Therefore, a preset orientation set corresponding to a focal length of the lens assembly may be determined based on the focal length of the lens assembly, and when the reflector faces each preset orientation in the preset orientation set, the laser is controlled to emit the first laser light.

It should be understood that determining, based on the focal length of the lens assembly, the preset orientation set corresponding to the focal length may alternatively be understood as adjusting the detection range of the lens assembly.

Optionally, the MEMS micromirror is further configured to reflect the at least one second laser light beam, to scan the detection range of the MEMS micromirror.

Detection may be performed in a coaxial manner within the detection range of the MEMS micromirror. In a MEMS-based scanning manner, a scanning direction is flexible and controllable, and anti-vibration reliability is higher.

Optionally, there are a plurality of MEMS micromirrors, and directions of the plurality of MEMS micromirrors are the same when the reflected light of the at least one second laser light beam is reflected.

Compared with that in a manner in which one MEMS micromirror performs reflection, in a manner in which a plurality of MEMS micromirrors in a same direction are used to reflect the reflected light of the second laser light to the optical detector, an area of a reflector is increased, so that energy of the reflected light that is of the second laser light and that is received by the optical detector is increased. In this way, an effective detection distance is increased when the MEMS micromirror is used for coaxial detection. In other words, an effective detection distance of the detection apparatus for the detection range of the MEMS micromirror is increased.

The MEMS micromirror is further configured to reflect the at least one first laser light, to scan the detection range of the lens assembly.

Distance detection may be performed in an off-axis manner within the detection range of the lens assembly. A same MEMS micromirror is used to scan the detection range of the MEMS micromirror and the detection range of the lens assembly, so that a quantity of MEMS micromirrors can be reduced, a quantity of control signals is reduced, and difficulty in controlling the MEMS micromirror is reduced.

Figure 13:
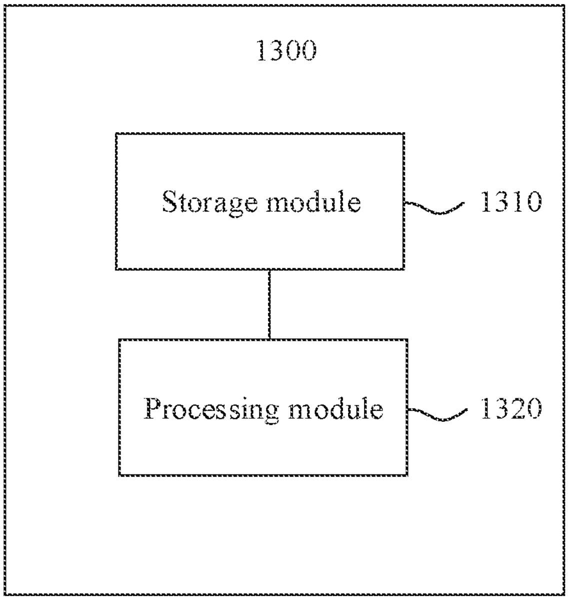
FIG. 13 is a schematic diagram of a structure of a control apparatus of a detection apparatus according to an embodiment of this application.

FIG. 13 is a schematic diagram of a structure of a control apparatus of a detection apparatus according to an embodiment of this application.

The detection apparatus includes at least one laser, at least one planar array detector, at least one lens assembly, at least one optical detector, and at least one micro electro mechanical system MEMS micromirror.

Optionally, a control apparatus 1300 of the detection apparatus includes a storage module 1310 and a processing module 1320. The storage module 1310 is configured to store a program. When the program is run in the processing module 1320, the processing module 1320 is configured to perform the foregoing control method of the detection apparatus.

Specifically, the processing module 1320 is configured to control the at least one laser to emit at least one first laser light beam, where reflected light of the at least one first laser light beam is focused to the planar array detector by using the lens assembly, and the reflected light of the at least one first laser light beam is located within a detection range of the lens assembly.

The processing module 1320 is further configured to control the at least one laser to emit at least one second laser light beam, where reflected light of the at least one second laser light beam is reflected to the optical detector by the MEMS micromirror, and the reflected light of the at least one second laser light beam is located within a detection range of the MEMS micromirror.

Optionally, a focal length of the lens assembly is adjustable, and when the focal length of the lens assembly is increased, a laser scanning density within the detection range of the lens assembly is increased.

Optionally, the at least one first laser light beam is emitted by at least one first laser in the at least one laser, and the at least one second laser light beam is emitted by at least one second laser in the at least one laser, where the at least one first laser is different from the at least one second laser.

Optionally, there is no blind region between the detection range of the lens assembly and the detection range of the MEMS micromirror.

Optionally, the processing module 1320 is further configured to adjust the detection range of the MEMS micromirror and/or the detection range of the lens assembly, so that there is no overlapping between the detection range of the lens assembly and the detection range of the MEMS micromirror.

Optionally, the MEMS micromirror is further configured to reflect the at least one second laser light beam, to scan the detection range of the MEMS micromirror.

Optionally, there are a plurality of MEMS micromirrors, and directions of the plurality of MEMS micromirrors are the same when the reflected light of the at least one second laser light beam is reflected.

Optionally, the MEMS micromirror is further configured to reflect the at least one first laser light, to scan the detection range of the lens assembly.

Figure 14:
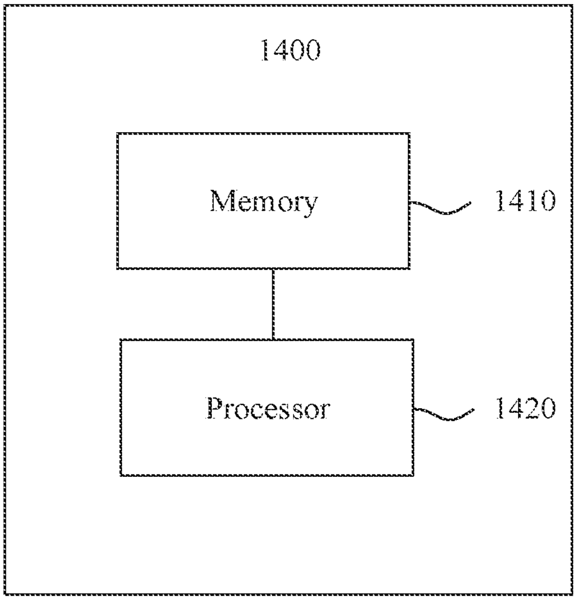
FIG. 14 is a schematic diagram of a structure of another control apparatus of a detection apparatus according to an embodiment of this application.

FIG. 14 is a schematic diagram of a structure of a control apparatus of a detection apparatus according to an embodiment of this application.

The detection apparatus includes at least one laser, at least one planar array detector, at least one lens assembly, at least one optical detector, and at least one micro electro mechanical system MEMS micromirror.

Optionally, a control apparatus 1400 of the detection apparatus includes a memory 1410 and a processor 1420. A memory 1410 is configured to store a program.

When the program is run in the processor 1420, the processor 1420 is configured to perform the foregoing control method of the detection apparatus.

Specifically, the processor 1420 is configured to control the at least one laser to emit at least one first laser light beam, where reflected light of the at least one first laser light beam is focused to the planar array detector by using the lens assembly, and the reflected light of the at least one first laser light beam is located within a detection range of the lens assembly.

The processor 1420 is further configured to control the at least one laser to emit at least one second laser light beam, where reflected light of the at least one second laser light beam is reflected to the optical detector by the MEMS micromirror, and the reflected light of the at least one second laser light beam is located within a detection range of the MEMS micromirror.

An embodiment of this application further provides a control method of a detection apparatus. The detection apparatus includes at least one laser, at least one planar array detector, at least one lens assembly, at least one optical detector, and at least one micro electro mechanical system MEMS micromirror.

The control method of the detection apparatus includes: generating control information and sending the control information to the detection apparatus.

The control information may be used to indicate the detection apparatus to adjust a laser scanning density, so that when a focal length of the lens assembly is increased, the laser scanning density within the detection range of the lens assembly is increased.

The control information may be further configured to indicate the detection apparatus to adjust a detection range of the lens assembly and a detection range of the MEMS micromirror, so that there is no blind region between the detention range of the lens assembly and the detection range of the MEMS micromirror.

The control information may be further configured to indicate the detection apparatus to adjust the detection range of the lens assembly and the detection range of the MEMS micromirror, so that there is no overlapping between the detention range of the lens assembly and the detection range of the MEMS micromirror.

The control information may be further used to control at least one first laser of the detection apparatus to emit at least one first laser light beam, and control at least one second laser of the detection apparatus to emit at least one second laser light beam.

An embodiment of this application further provides a computer-readable storage medium. The computer-readable storage medium has program instructions. When the program instructions are directly or indirectly executed, the foregoing method is implemented.

An embodiment of this application further provides a computer program product including instructions. When the computer program product is run on a computing device, the computing device is enabled to perform the foregoing method, or the computing device is enabled to implement a function of the foregoing apparatus.

An embodiment of this application further provides a chip system. The chip system includes at least one processor and an interface circuit. The interface circuit is configured to provide program instructions or data for the at least one processor, and the at least one processor is configured to execute the program instructions, to implement the foregoing method.

An embodiment of this application further provides a lidar system, including a processor and the foregoing detection apparatus. The processor is configured to control the at least one laser in the detection apparatus to emit laser light. The processor is further configured to calculate a distance based on reflected light that is of the laser light and that is received by the at least one optical detector and the at least one planar array detector.

An embodiment of this application further provides a terminal, including the foregoing lidar system. Further, the terminal may be an intelligent transportation device (a vehicle or an uncrewed aerial vehicle), a smart home device, an intelligent manufacturing device, a robot, or the like. The intelligent transportation device may be, for example, an automated guided vehicle (automated guided vehicle, AGV) or an uncrewed transportation vehicle.

A person of ordinary skill in the art may be aware that units, modules, and algorithm steps in the examples described with reference to embodiments disclosed in this specification may be implemented by electronic hardware or a combination of computer software and electronic hardware. Whether the functions are executed by hardware or software depends on a particular application and a design constraint condition that are of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A detection apparatus, comprising: at least one laser, at least one planar array detector, at least one lens assembly, at least one optical detector, and at least one micro electro mechanical system (MEMS) micromirror, wherein the lens assembly is configured to focus reflected light of at least one first laser light beam to the planar array detector, and the reflected light of the at least one first laser light beam is located within a detection range of the lens assembly; and the MEMS micromirror is configured to reflect reflected light of at least one second laser light beam to the optical detector, and the reflected light of the at least one second laser light beam is within a detection range of the MEMS micromirror, wherein the at least one first laser light beam and the at least one second laser light beam are emitted by using the at least one laser, and wherein a focal length of the lens assembly is adjustable, and when the focal length of the lens assembly is increased, a laser scanning density within the detection range of the lens assembly is increased.

2. The apparatus according to claim 1, wherein the at least one first laser light beam is emitted by at least one first laser in the at least one laser, and the at least one second laser light beam is emitted by at least one second laser in the at least one laser, wherein the at least one first laser is different from the at least one second laser.

3. The apparatus according to claim 1, wherein there is no blind region between the detection range of the lens assembly and the detection range of the MEMS micromirror.

4. The apparatus according to claim 1, wherein adjustment of the detection range of the lens assembly matches adjustment of the detection range of the MEMS micromirror, wherein there is no overlapping between the detection range of the lens assembly and the detection range of the MEMS micromirror.

5. The apparatus according to claim 1, wherein the MEMS micromirror is further configured to reflect the at least one second laser light beam, to scan the detection range of the MEMS micromirror.

6. The apparatus according to claim 5, wherein there are a plurality of MEMS micromirrors, and directions of the plurality of MEMS micromirrors are the same when the reflected light of the at least one second laser light beam is reflected.

7. The apparatus according to claim 5, wherein the MEMS micromirror is further configured to reflect the at least one first laser light beam, to scan the detection range of the lens assembly.

8. A control method, applied to a detection apparatus, wherein the detection apparatus comprises at least one laser, at least one planar array detector, at least one lens assembly, at least one optical detector, and at least one micro electro mechanical system (MEMS) micromirror; and the method comprises:

controlling the at least one laser to emit at least one first laser light beam, wherein reflected light of the at least one first laser light beam is focused to the planar array detector by using the lens assembly, and the reflected light of the at least one first laser light beam is located within a detection range of the lens assembly; and controlling the at least one laser to emit at least one second laser light beam, wherein reflected light of the at least one second laser light beam is reflected to the optical detector by the MEMS micromirror, and the reflected light of the at least one second laser light beam is located within a detection range of the MEMS micromirror, and wherein a focal length of the lens assembly is adjustable, and when the focal length of the lens assembly is increased, a laser scanning density within the detection range of the lens assembly is increased.

9. The method according to claim 8, wherein the at least one first laser light beam is emitted by at least one first laser in the at least one laser, and the at least one second laser light beam is emitted by at least one second laser in the at least one laser, wherein the at least one first laser is different from the at least one second laser.

10. The method according to claim 8, wherein there is no blind region between the detection range of the lens assembly and the detection range of the MEMS micromirror.

11. The method according to claim 8, wherein the method further comprises:

adjusting the detection range of the MEMS micromirror and/or the detection range of the lens assembly, wherein there is no overlapping between the detection range of the lens assembly and the detection range of the MEMS micromirror.

12. The method according to claim 8, wherein the MEMS micromirror is further configured to reflect the at least one second laser light beam, to scan the detection range of the MEMS micromirror.

13. The method according to claim 12, wherein there are a plurality of MEMS micromirrors, and directions of the plurality of MEMS micromirrors are the same when the reflected light of the at least one second laser light beam is reflected.

14. The method according to claim 12, wherein the MEMS micromirror is further configured to reflect the at least one first laser light, to scan the detection range of the lens assembly.

15. A control apparatus for controlling a detection apparatus, wherein the detection apparatus comprises at least one laser, at least one planar array detector, at least one lens assembly, at least one optical detector, and at least one micro electro mechanical system (MEMS) micromirror; wherein the control apparatus comprises:

at least one processor; and one or more memories coupled to the at least one processor and storing programming instructions for execution by the at least one processor to:

control the at least one laser to emit at least one first laser light beam, wherein reflected light of the at least one first laser light beam is focused to the planar array detector by using the lens assembly, and the reflected light of the at least one first laser light beam is located within a detection range of the lens assembly; and control the at least one laser to emit at least one second laser light beam, wherein reflected light of the at least one second laser light beam is reflected to the optical detector by the MEMS micromirror, and the reflected light of the at least one second laser light beam is located within a detection range of the MEMS micromirror, wherein a focal length of the lens assembly is adjustable, and when the focal length of the lens assembly is increased, a laser scanning density within the detection range of the lens assembly is increased.

16. The apparatus according to claim 15, wherein the at least one first laser light beam is emitted by at least one first laser in the at least one laser, and the at least one second laser light beam is emitted by at least one second laser in the at least one laser, wherein the at least one first laser is different from the at least one second laser.

17. The apparatus according to claim 15, wherein there is no blind region between the detection range of the lens assembly and the detection range of the MEMS micromirror.

18. The apparatus according to claim 15, wherein adjustment of the detection range of the lens assembly matches adjustment of the detection range of the MEMS micromirror, wherein there is no overlapping between the detection range of the lens assembly and the detection range of the MEMS micromirror.

19. The apparatus according to claim 15, wherein the MEMS micromirror is further configured to reflect the at least one second laser light beam, to scan the detection range of the MEMS micromirror.

20. The apparatus according to claim 19, wherein there are a plurality of MEMS micromirrors, and directions of the plurality of MEMS micromirrors are the same when the reflected light of the at least one second laser light beam is reflected.

* * * * *